US012673474B2

(12) United States Patent
Chavez et al.

(10) Patent No.: US 12,673,474 B2
(45) Date of Patent: Jul. 7, 2026

(54) ELECTRICAL DRIVEN METAL BRIQUETTING SYSTEM AND METHOD

(71) Applicant: All-Met Recycling, Inc., Anaheim, CA (US)

(72) Inventors: Nicholas Steven Chavez, Placentia, CA (US); Steven Joseph Chavez, Fullerton, CA (US); Charles Arnold, Montrose, MN (US); Andrew Ollig, Waverly, MN (US); Dean Kales, St Cloud, MN (US); Daniel Buczinski, Goddard, KS (US)

(73) Assignee: All-Met Recycling, Inc., Anaheim, CA (US)

( * ) Notice: Subject to any disclaimer, the term of this patent is extended or adjusted under 35 U.S.C. 154(b) by 0 days.

(21) Appl. No.: 19/315,485

(22) Filed: Aug. 30, 2025

(65) Prior Publication Data

US 2026/0070296 A1 Mar. 12, 2026

Related U.S. Application Data

(60) Provisional application No. 63/691,571, filed on Sep. 6, 2024.

(51) Int. Cl.
*B30B 9/32* (2006.01)
*B30B 15/00* (2006.01)
(Continued)

(52) U.S. Cl.
CPC .......... *B30B 9/327* (2013.01); *B30B 15/0005* (2013.01); *B30B 15/148* (2013.01); *B30B 15/26* (2013.01); *B30B 15/30* (2013.01)

(58) Field of Classification Search
CPC ........... B30B 9/04; B30B 9/301; B30B 9/306; B30B 9/32; B30B 9/321; B30B 9/327;
(Continued)

(56) References Cited

U.S. PATENT DOCUMENTS 3,651,755 A * 3/1972 Gati ...................... B30B 9/3078
100/249
4,025,262 A 5/1977 Furman
(Continued)

FOREIGN PATENT DOCUMENTS

CN 212442502 U * 2/2021
GB 522515 A 6/1940
(Continued)

OTHER PUBLICATIONS

English translation of KR 10-2273979 B1, retrieved in Nov. 2025, 12 pages (Year: 2025).*

(Continued)

*Primary Examiner* — Jimmy T Nguyen
(74) *Attorney, Agent, or Firm* — Manatt, Phelps & Phillips, LLP

(57) ABSTRACT

A metal briquetting system (MBS) driven by electric power and configured to process metallic scraps or powders into dense, compact briquettes is disclosed. The system utilizes precision-engineered gearboxes, actuators, and control to efficiently convert raw materials into solid briquettes. The MBS handles Computer Numerical Control (CNC) exit conveyor metal powder or chips with exceptional speed and reliability. The system is engineered to optimize compression chamber configurations, thereby reducing its footprint while supporting high processing throughput. Additionally, the system can be programmed to enhance energy efficiency, leading to significantly lower energy consumption relative to hydraulic briquetting systems and to create a much safer working environment.

32 Claims, 12 Drawing Sheets

(51) Int. Cl.
*B30B 15/14* (2006.01)
*B30B 15/26* (2006.01)
*B30B 15/30* (2006.01)

(58) Field of Classification Search
CPC ... B30B 9/3039; B30B 9/3078; B30B 9/3089; B30B 15/0005; B30B 15/148; B30B 15/26; B30B 15/30; B30B 15/302; B09B 3/20
See application file for complete search history.

(56) References Cited

U.S. PATENT DOCUMENTS

| | | | | |
|---|---|---|---|---|
| 5,542,348 | A * | 8/1996 | Bendzick | B30B 9/327 100/249 |
| 5,873,304 | A * | 2/1999 | Ruf | B30B 9/301 100/249 |
| 6,729,229 | B1 * | 5/2004 | Wildes | B30B 9/3007 100/41 |
| 7,628,602 | B2 * | 12/2009 | Matsuda | B30B 9/067 425/258 |
| 2006/0110485 | A1 * | 5/2006 | Ruf | B30B 15/302 425/100 |
| 2009/0177306 | A1 | 7/2009 | Bosga | |

FOREIGN PATENT DOCUMENTS

| | | | | |
|---|---|---|---|---|
| GB | 850904 | | 10/1960 | |
| GB | 1271189 | A | 4/1972 | |
| KR | 102273979 | B1 * | 7/2021 | B09B 3/00 |
| KR | 102677412 | B1 * | 6/2024 | G06F 21/32 |

OTHER PUBLICATIONS

English translation of KR 10-2677412 B1, retrieved in Nov. 2025, 11 pages (Year: 2025).*

English translation of CN-212442502 U, retrieved in Nov. 2025, 8 pages (Year: 2025).*

* cited by examiner

ELECTRICAL DRIVEN METAL BRIQUETTING SYSTEM AND METHOD

RELATED APPLICATIONS

This application claims the benefit of, and priority to, U.S. Provisional Application No. 63/691,571, filed on Sep. 6, 2024, which is hereby incorporated herein by reference in its entirety.

BACKGROUND

Technical Field

This disclosure relates generally to a metal briquetting system (MBS). More particularly, this disclosure relates to an apparatus of a novel electrical driven metal briquetting system for producing metal briquettes.

Related Art

A metal briquetting system is typically designed to process metallic scraps, waste, or powders into valuable compact, high-density briquettes that are suitable for efficient handling and storage. These briquettes can be used in various industrial applications, such as recycling, smelting, and metal casting.

While hydraulic metal briquetting systems offer excellent power density and robust performance in many applications, their disadvantages include complexity, size, maintenance requirements, high power usage, environmental considerations, potential noise and energy inefficiencies, and potential fatal injuries.

SUMMARY

Accordingly, it is here recognized that there is a need for a metal briquetting system configured to streamline the compression chamber configurations, ensuring the smallest footprint possible for similar processing volumes as well as low power consumption.

Disclosed herein is a unique and inventive electrical driven metal briquetting system configured to process metallic scraps or powders into dense, compact briquettes. Through the use of selected gearboxes, actuators, and proprietary programming, the metal briquetting system efficiently converts raw materials into solid briquettes, capable of effectively handling metal powder or chips received from a pre-treatment processor, such as a CNC machine exit conveyor or auger.

In some embodiments, the metal briquetting system is configured to enable a significantly smaller footprint, facilitating the direct removal and return of coolant to the CNC machining center. This results in a cleaner and safer working environment overall as well as increasing the lifetime of coolant.

In some embodiments, by placing the metal briquetting system directly next to a CNC system, it reduces forklift travel throughout the shop by a significant factor of 8:1.

The metal briquetting system can be customized with unique programming to optimize energy usage, resulting in significantly lower energy consumption compared to hydraulic briquetting systems.

The main actuator controls the plunger tooling action required for making a briquette. The actuator positions and drives the plunger with speed and torque to achieve not only the pressure needed to make a briquette but the speed to do several cycles per minute. The plunger is positioned vertically and travels up and down at high rates of speed until it senses pressure. At which time it reconfigures its motion to torque instead of speed until a specified pressure is hit (that which is needed to make an acceptable briquette). Once done the plunger is also used to eject the briquette before it returns to the home position to begin another cycle.

The charging actuator or charging auger moves material into the main chamber for processing. This actuator or auger self-adjusts to allow briquettes to maintain a common size and weight no matter the density of the chip being processed. This actuator or auger can move tooling horizontally or can rotate diagonally, forcing material into the chamber.

The hopper feeding system regulates the amount of material feed into the charging component using an auger to direct material into the charging. The hopper is used for receiving and holding the material and then feeding the material into the charging using an auger driven by gear reduced electric motor. A sensor in the hopper can be used to communicate with the system if it has material. This allows the system to constantly be on and ready.

The door actuator provides the stop against which the briquette is formed, and the actuator allows the door to be opened allowing the briquette to be ejected. This is performed by a slide motion allowing the door to open and close as needed.

The programmable drive controls makes the system fully electric for the actuators to provide speed and torque as well as self-adjusting measures. The configuration enables tooling to minimize collisions or damage components that might be out of position.

The system is configured with a compact footprint, making it ideal for space-constrained environments. Additionally, by eliminating the use of hydraulics, it completely removes the risk of fluid leaks, environmental spills, and hazardous high-pressure failures typically associated with hydraulic systems.

Single block frame system and the vertical use of the main actuator allows the MBS to (1) minimize the footprint for like volume briquette systems and (2) be the easiest and fastest "change out" of a damaged unit utilizing a hook frame which allows maintenance to remove fastening bolts without worry of system falling. The system can be lifted on and off to make removal and exchange quick and safe.

Coolant and debris cleanout gives operators the ability to easily clean out fines left from briquette processing. Debris build up can cause performance issues and costly damage.

Coolant reservoir that returns coolant directly back to the CNC systems from which it came. The size of the MBS allows it to be located directly at the chip exit conveyer of a Computer Numerical Control (CNC) machine. This close proximity allows the MBS to return coolant directly back into the CNC Machine which has its own coolant filtration systems. This unique position means there will be no mixing of contaminants or oils which are common in conventional briquetting systems therefore extending the lifetime of coolant.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DESCRIPTION OF EXEMPLARY EMBODIMENTS

Figure 1:
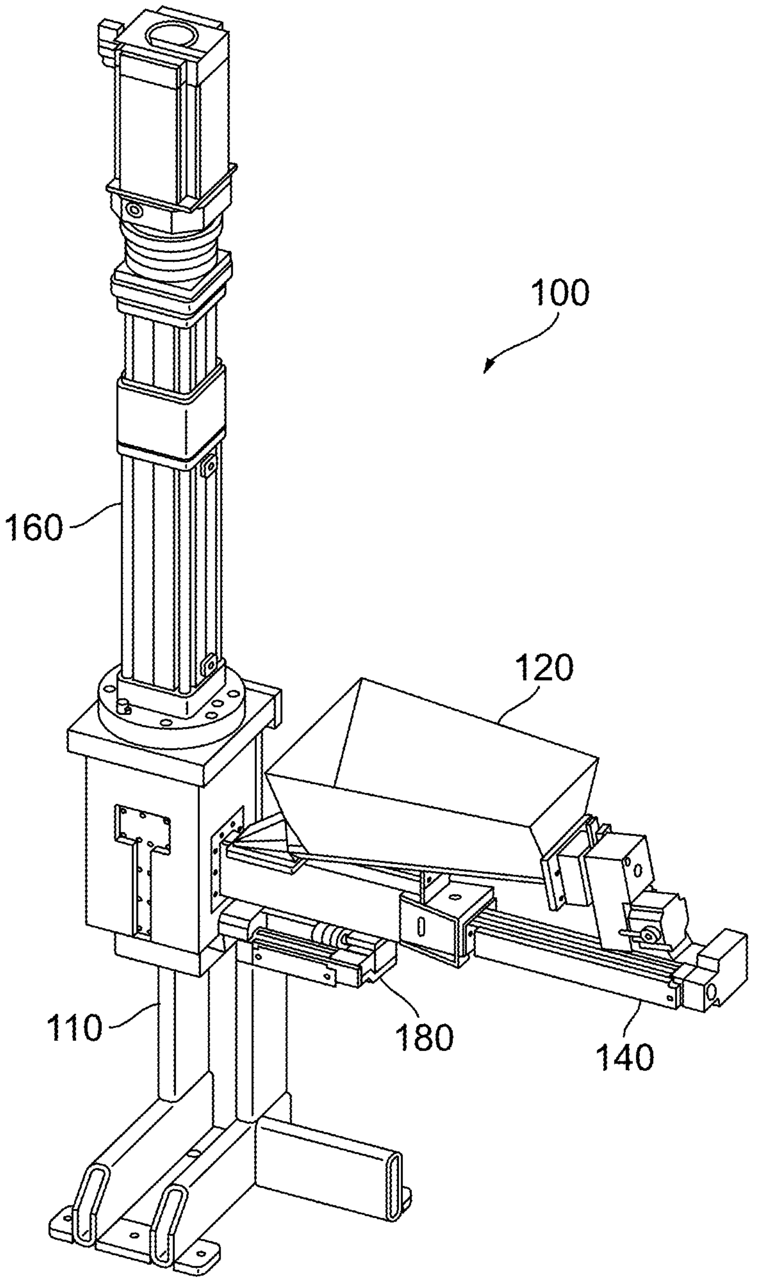
FIG. 1 illustrates a perspective view of an exemplary metal briquetting system.
Figure 2:
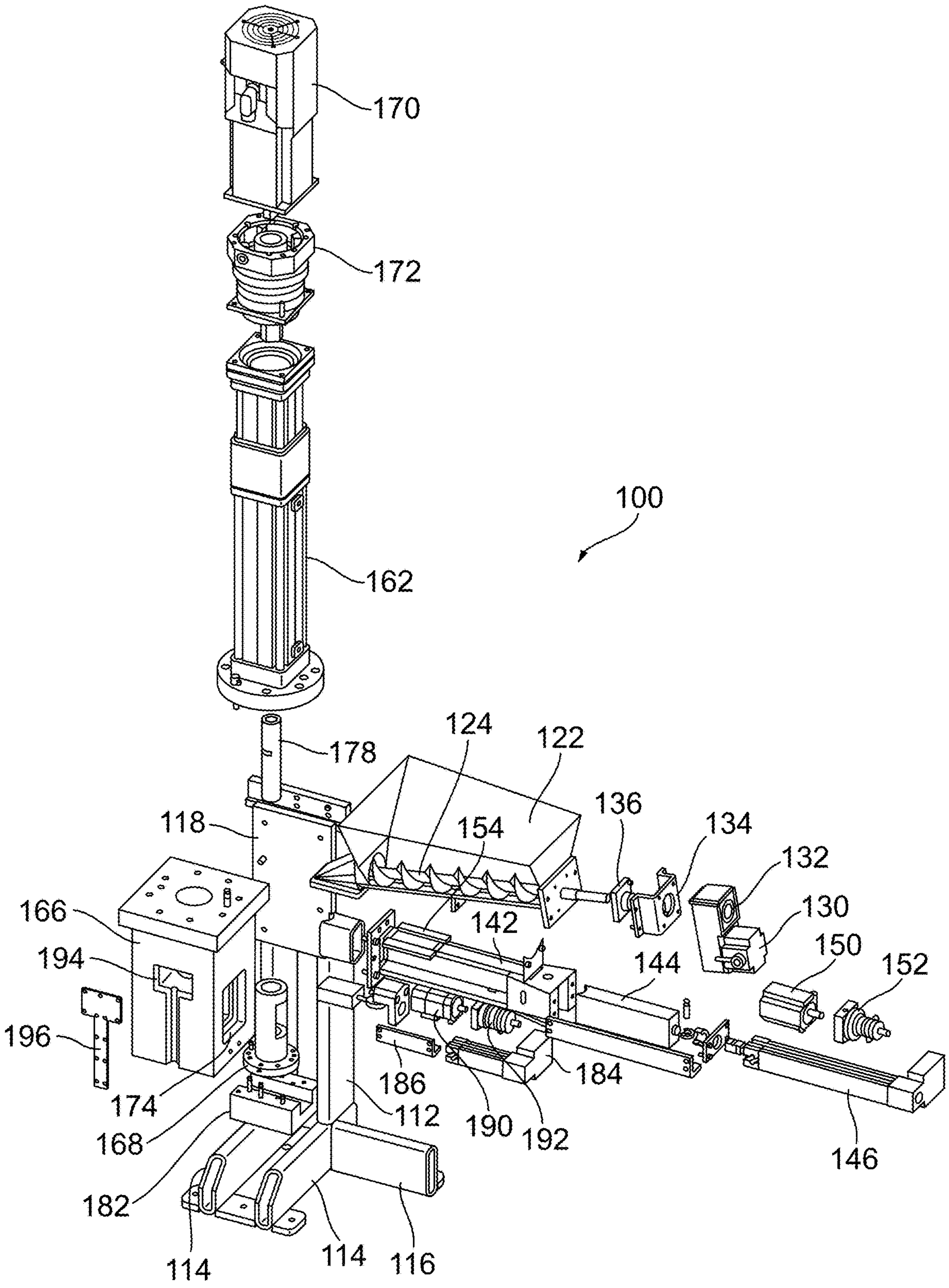
FIG. 2 illustrates an exploded view of the exemplary metal briquetting system of FIG. 1.
Figure 3:
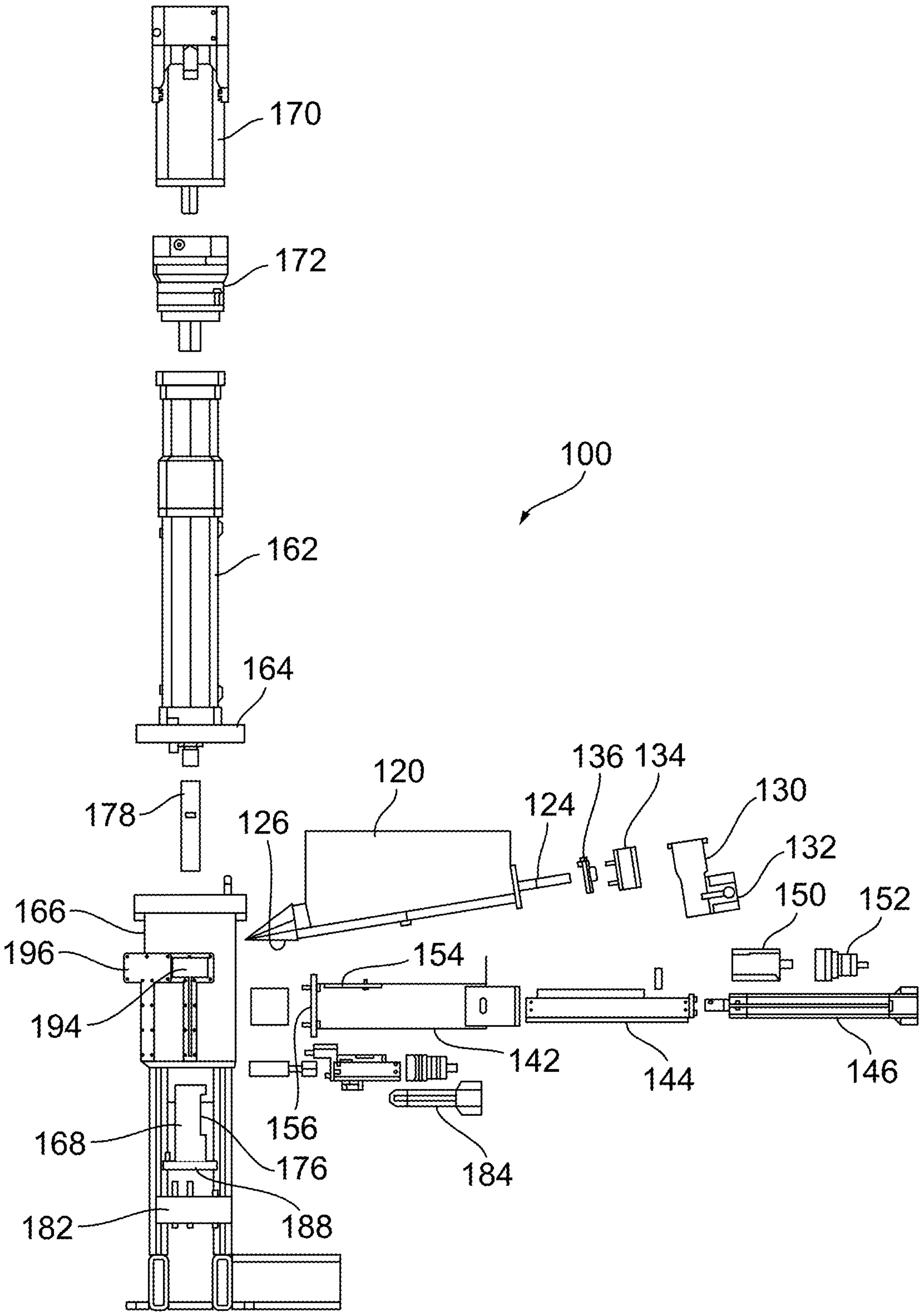
FIG. 3 illustrates a front elevated exploded view of the exemplary metal briquetting system of FIG. 1.
Figure 4:
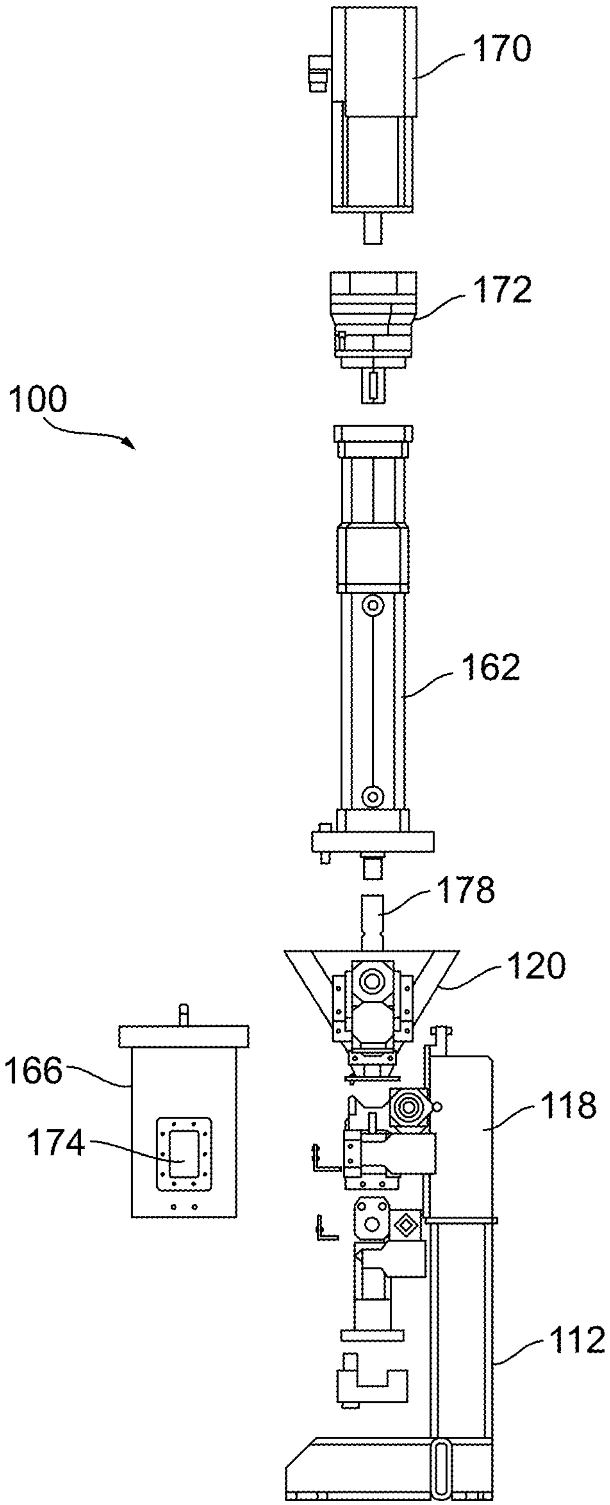
FIG. 4 illustrates a side elevated exploded view of the exemplary metal briquetting system of FIG. 1.
Figure 5:
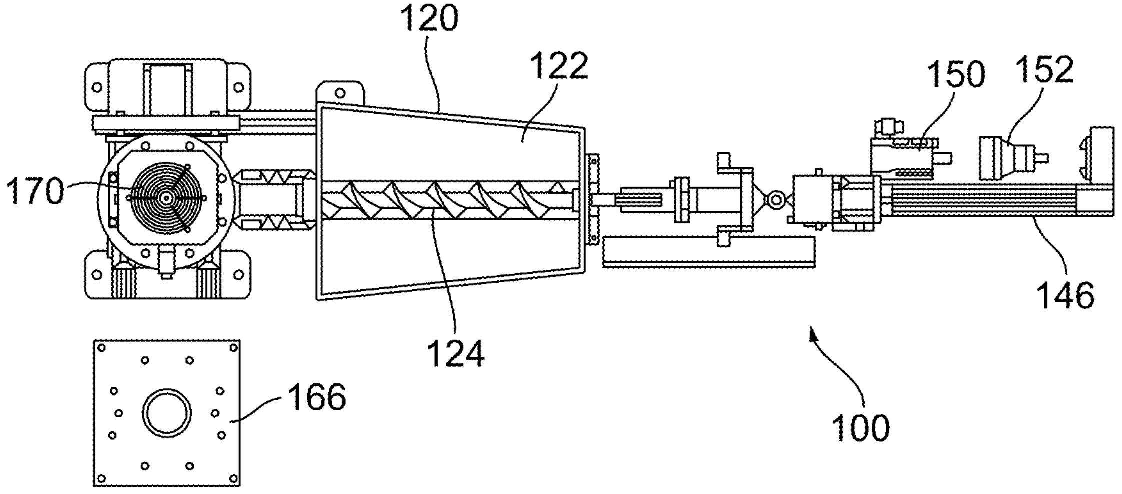
FIG. 5 illustrates a top exploded view of the exemplary metal briquetting system of FIG. 1.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the design of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

FIGS. 1-5 illustrate a variety of views of an exemplary metal briquetting system 100 according to the present disclosure. The metal briquetting system 100 comprises a variety of components for performing the briquetting process. In some embodiments, the metal briquetting system 100 comprises a hopper feeding assembly 120, a charging actuator assembly 140, a main actuator assembly 160, and a door actuator assembly or puck stop actuator assembly 180.

Figure 10:
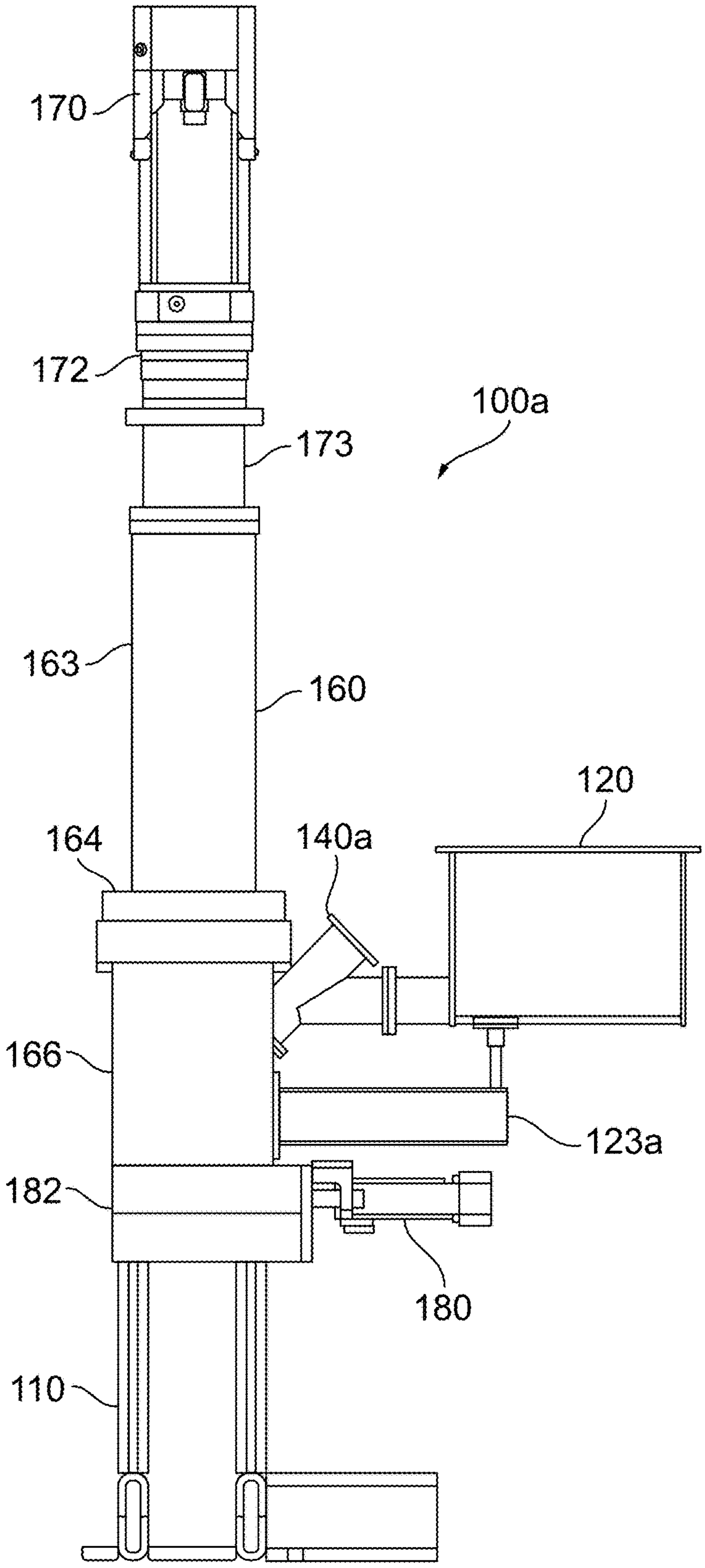
FIG. 10 illustrates a side view of another exemplary metal briquetting system.
Figure 11:
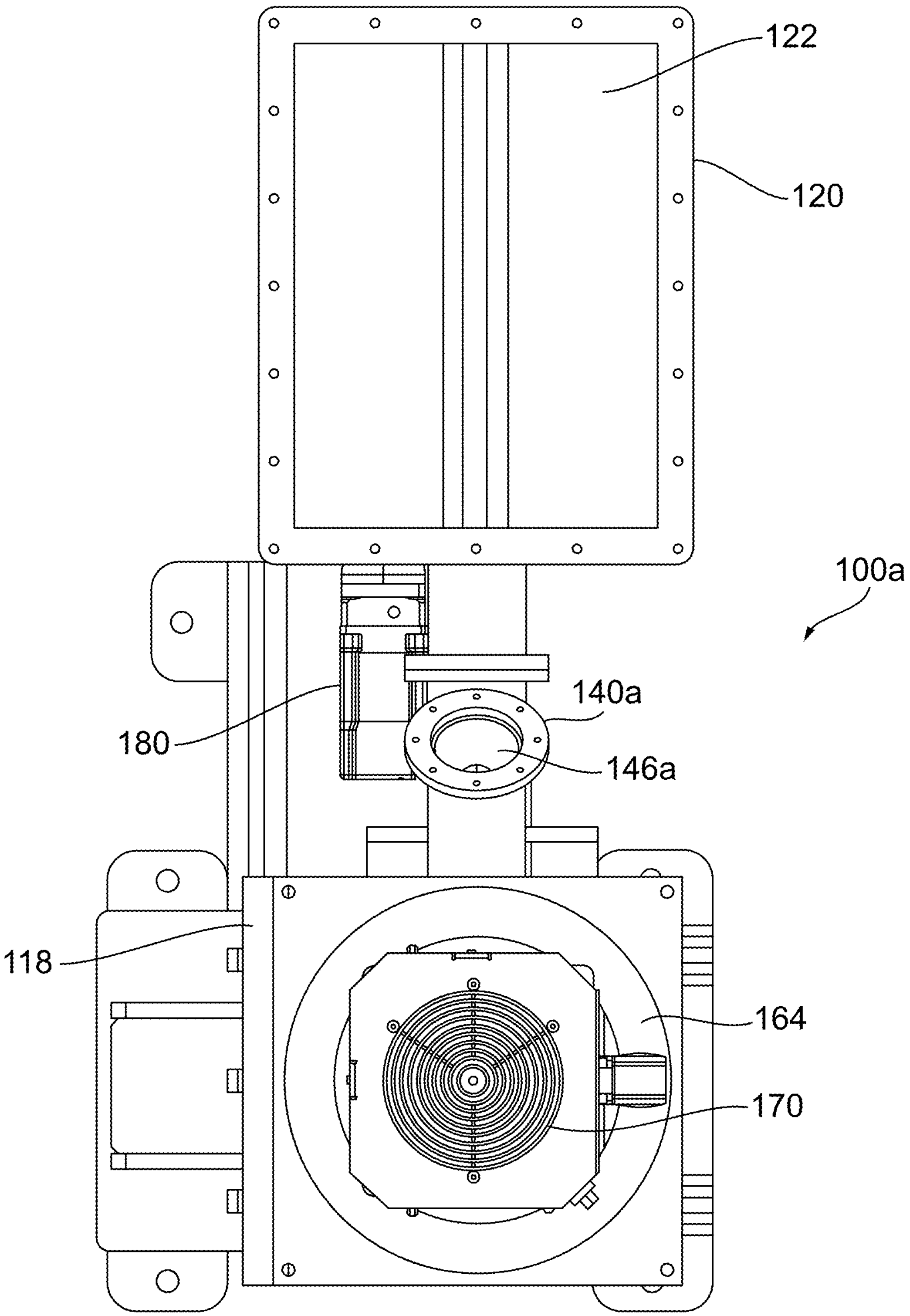
FIG. 11 illustrates a top view of the exemplary metal briquetting system of FIG. 10.
Figure 12:
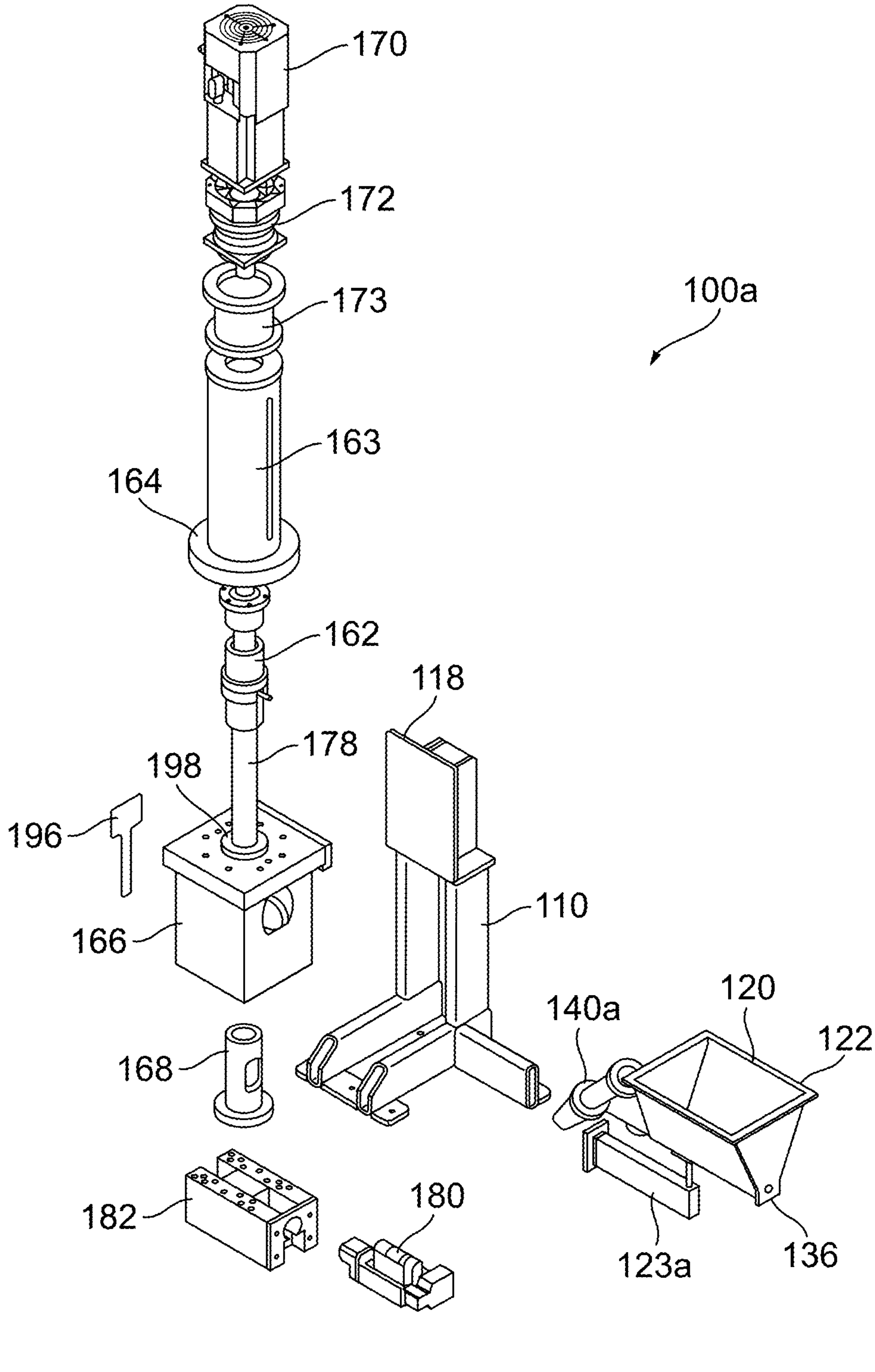
FIG. 12 illustrates an exploded view of the exemplary metal briquetting system of FIG. 10.

FIGS. 10-12 illustrate a variety of views of another exemplary metal briquetting system **100*a* with alternative components according to the present disclosure. The metal briquetting system 100*a* comprises a variety of components for performing the briquetting process. In some embodiments, the metal briquetting system 100*a* comprises a hopper feeding assembly 120, a charging assembly 140*a*, a main actuator assembly 160, and a door actuator assembly or puck stop actuator assembly 180**.

Figure 6:
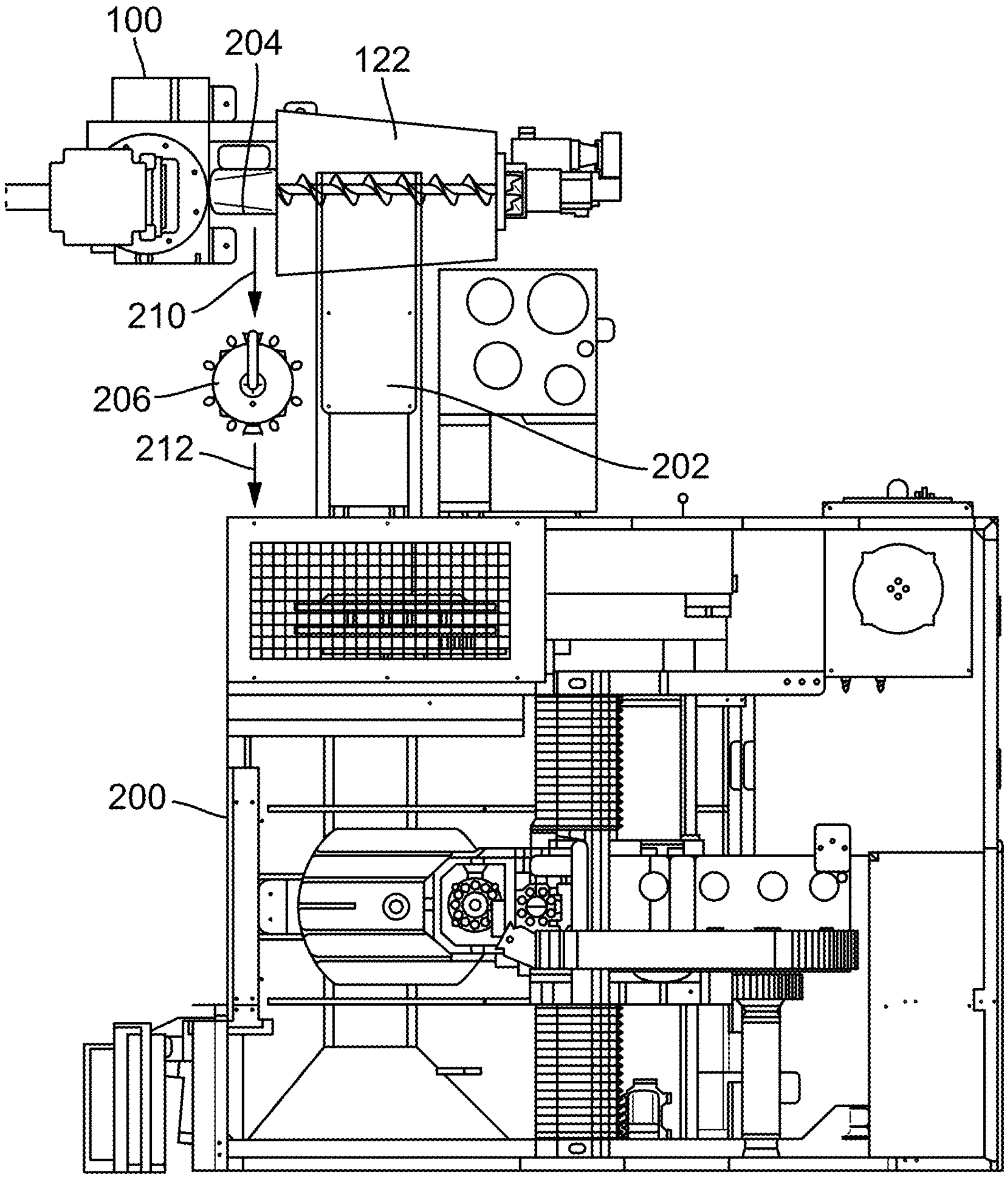
FIG. 6 illustrates an exemplary floorplan showing the exemplary metal briquetting system of FIG. 1 together with a pre-treatment processor.

Referring also to FIG. 6, in some embodiments, a pre-treatment processor 200 can be used to separate ferrous metals from other raw materials. For example, if the waste stream contains ferrous metals (metals that contain iron), magnets can be used to separate metals from non-ferrous materials, as magnets can attract and separate iron and steel from aluminum, copper, and other non-ferrous metals. This preparation procedure ensures that the briquetting process is efficient and produces high-quality metal briquettes suitable for recycling or further processing. In some embodiments, the pre-treatment processor 200 includes a computer numerical control (CNC) machine to automate the control of machine tools through the use of a computer.

Referring to the figures, the hopper feeding assembly 120 includes a chamber feed hopper or primary feed hopper 122 which is configured to regulate a predefined amount of raw material feed into the charging actuator assembly 140 (or the charging auger assembly **140*a*) by using a main feed auger or auger shaft 124 to direct material into the charging actuator assembly 140 (or the charging auger assembly 140*a*) through a feeding throat 126. In some embodiments, the primary feed hopper 122 is used for catching and holding the raw metal material (not shown) fed from a computer numerical control (CNC) machine (not shown) and then feeding the material into the charging actuator assembly 140 (or the charging auger assembly 140*a*) by the auger shaft 124**.

In some embodiments, the auger shaft 124 includes a cylindrical rod or tube made of, for example, steel or stainless steel to withstand the forces involved in conveying operations. In some embodiments, one end of the auger shaft 124 is connected and driven by an electrical auger motor drive 130. In some embodiments, the electrical auger motor drive 130 is a DC motor.

In some embodiments, the electric auger motor drive 130 is controlled by a gearbox 132. In some embodiments, the gearbox 132 is used to control and optimize the speed of the motor 130. The chosen gearbox 132 can increase or decrease the speed of the auger shaft or motor output shaft 124 by selecting different gear ratios (the ratio between the numbers of teeth on gears) or frequencies of the motor 130. In some embodiments, the gearbox 132 can be further used to control and optimize the rotational force or torque of the motor 130 by increasing or decreasing the torque output of the motor 130. Higher gear ratios (where the driven gear is larger than the driving gear) reduce the output speed but increase the torque, which is useful for applications requiring more power.

In some embodiments, the electrical DC auger motor 130 is mounted by a motor mount 134 that the electrical motor 130 is adjacent to the primary feed hopper 122 so as to optimize the motor output.

In some embodiments, a main feed auger bearing 136 is provided to support the auger shaft 124 to ensure that the auger shaft 124 remain aligned and stable during briquetting operation.

Referring to the figures, the charging actuator assembly 140 (or the charging auger assembly 140*a*) is configured to receive metal material from the hopper feeding assembly 120 through a charging window 154. In some embodiments, the charging window 154 of the housing frame 142 is positioned beneath the feeding throat 126 of the hopper feeding assembly 120. In some embodiments, the charging actuator assembly 140 includes a charging housing frame 142, a charging tooling 144, a charging actuator 146, and other components. In some embodiments, the charging auger assembly 140*a* can include a charging housing frame, a charging tooling, a charging auger 146*a*, and other components.

In some embodiments, the charging actuator assembly 140 is positioned horizontally that a longitudinal axis of the charging actuator assembly 140 is substantially parallel to the ground. In some embodiments, the charging auger assembly 140*a* is positioned diagonally that a longitudinal axis of the charging auger assembly 140*a* is substantially parallel to the ground.

In some embodiments, the charging tooling 144 is configured to prepare the material in the charging housing frame 142 before it enters the main briquetting process. For example, the charging tooling 144 can be used to compact and pre-condition the raw material feedstock before it enters the main actuator assembly 160. This preparation step ensures that the material is in an optimal state for the main briquetting process.

The charging actuator 146 (or the charging auger 146*a*) can be configured to feed the metal material in the charging housing frame 142 through a pre-compress discharging window 156 of the charging actuator assembly 140 (or the charging auger assembly 140*a*) and a compression chamber charge window 174, of the main actuator assembly 160, into a main compression chamber block 166 of the main actuator assembly 160 where the briquettes are formed.

In some embodiments, the charging actuator 146 (or the charging auger 146*a*) is electrically driven by an electrical charging motor drive or electrical motor 150. In some embodiments, the electrical motor 150 is a DC motor. In some embodiments, the electrical motor 150 is controlled by a controller or processor, for example, the controller or processor depicted in the descriptions in connection with FIG. 7 and FIG. 9. In some embodiments, the motor gearbox 150 is controlled by the controller or processor. By selecting different gear ratios (or frequencies) of the motor 150, the motor gearbox 150 can be used to control and optimize the speed of the motor 150 to increase or decrease the speed of pushing the material into the main actuator assembly 160.

The electrical driven charging actuator assembly 140 (or the charging auger assembly 140*a*) offers several advantages over other types of or processes, such as a hydraulic cylinder. For example, the electrical driven charging actuator assembly 140 (or the charging auger assembly 140*a*) can be integrated into other components in the metal briquetting system 100. In some embodiments, the electrical driven charging actuator assembly 140 (or the charging auger assembly 140*a*) is integrated with the main actuator assembly 160 allowing for precise control over speed, acceleration, and position. This allows for automated operation, where sensors (not shown) and feedback mechanisms adjust the feed rate based on factors such as material flow, pressure levels, and desired briquette characteristics. In some embodiments, the charging actuator assembly 140 (or the charging auger assembly 140*a*) is configured to be synchronized with the main actuator or plunger assembly 160 that performs the actual compression and extrusion of the briquettes. This ensures that the compression chamber block 166 of the main actuator assembly 160 is adequately filled with material before the main compression and extrusion process begins.

In addition, an electrical driven charging actuator assembly 140 (or the charging auger assembly 140*a*) can be integrated into programmable logic controllers and computer numerical control (CNC) systems. This flexibility enables complex motion profiles and synchronized movements in multi-axis systems. Moreover, the electrical driven charging actuator assembly 140 (or the charging auger assembly 140*a*) can incorporate safety features such as overload protection, position feedback, and emergency stop functions, for example, from the puck stop actuator 180, more easily compared to other processing types.

In some embodiments, the charging actuator assembly 140 (or the charging auger assembly 140*a*) automatically adjusts to ensure uniform size and weight of the briquettes, regardless of the density of the metal powder or chips being processed. The charging actuator assembly 140 (or the charging auger assembly 140*a*) controls the rate at which the metal material is fed into the compression chamber block 166 of the main actuator assembly 160. This ensures a steady and consistent supply of material, optimizing the efficiency and effectiveness of the briquetting process. By regulating the feed rate, the charging actuator assembly 140 (or the charging auger assembly 140*a*) helps maintain optimal pressure and density within the compression chamber block 166 during the briquetting process.

Moreover, compared to hydraulic actuators or cylinders, the electrical driven charging actuator assembly 140 (or the charging auger assembly 140*a*) can be more energy-efficient, especially during operation. The electrical driven charging actuator assembly 140 (or the charging auger assembly 140*a*) consumes power only when actively moving or holding position, unlike hydraulic systems that rely on constant pumping of hydraulic fluid at pressures of about 5,000 PSI. Furthermore, the electrical driven charging actuator assembly 140 (or the charging auger assembly 140*a*) operates quietly compared to hydraulic actuators or cylinders, which can be beneficial in environments where noise reduction is important. Additionally, the electrical driven charging actuator assembly 140 (or the charging auger assembly 140*a*) requires less maintenance compared to hydraulic systems, which need periodic fluid checks. Furthermore, an electrical driven charging actuator assembly 140 (or the charging auger assembly 140*a*) does not require hydraulic fluids, which eliminates the risk of leaks and spills as well as deadly accidents.

In some embodiments, one or more rotary encoders or linear position sensors, for example, potentiometers or linear variable differential transformers, can be used to monitor the exact position of the charging actuator 146. These sensors can provide continuous feedback on the charging actuator's location within its range of motion.

In some embodiments, one or more tachometers or encoder-based speed sensors can be used to measure the speed of the charging actuator 146 (or the charging auger 146*a*) by tracking the rate at which it moves. This data helps in adjusting the operation dynamically to maintain optimal performance.

In some embodiments, one or more load cells or torque transducers can be used to measure the force or torque exerted by the charging actuator 146 (or the charging auger 146*a*). This information is crucial for understanding the load conditions and ensuring the actuator or the auger operates within its designed capacity.

Thus, the electrical driven charging actuator assembly 140 (or the charging auger assembly 140*a*) can communicate data such as position, speed, and torque to higher-level control systems for real-time monitoring, diagnostics, and predictive maintenance, enabling more efficient charging operation.

In some embodiments, a ball screw actuator is used in the charging operation to convert rotational motion into linear motion. Alternatively, a lead screw mechanism is used in the charging operation to convert rotational motion into linear motion. A ball screw actuator offers several advantages, especially when precise linear motion, high efficiency, and durability are required. This mechanism is responsible for moving the plunger back and forth with precision. For example, due to the rolling contact between the balls and the screw threads, a ball screw actuator reduces friction compared to sliding contact in other types of actuators like lead screws. As a result, less energy is wasted as heat, making ball screw actuators more energy efficient. In addition, a ball screw actuator provides highly accurate and precise linear motion. The rolling motion of the balls in the screw threads reduces backlash, resulting in smooth and precise movement. This makes the ball screw actuator ideal for applications that require precise positioning, such as CNC machines, robotic systems, and precision manufacturing equipment.

The main actuator (or main plunger actuator) assembly 160 controls the plunger tooling action required for making a briquette. The main plunger actuator assembly 160 is configured to facilitate the compression and extrusion of metal powder or chips, received from the charging actuator assembly 146 (or the charging auger 146*a*), into dense briquettes.

In some embodiments, the main plunger actuator assembly 160 includes a cylindrical or conical compression tooling or plunger 178. In some embodiments, the compression tooling 178 is made of durable and wear-resistant material, for example, hardened steel, designed to withstand high pressures and repeated use. In some embodiments, the compression tooling 178 fits snugly into a cylindrical compression chamber inner wear sleeve 168 located in a compression chamber block 166. The compression chamber inner wear sleeve 168 can have a compression chamber sleeve charge window 176 configured to be aligned with the compression chamber charge window 174 for receiving metal powder or chips from the charging actuator assembly 140 (or the charging auger assembly 140*a*). In some embodiments, the compression chamber inner wear sleeve 168 is made of heavy-duty steel to withstand the forces generated during compression. In some embodiments, the compression chamber block 166 is secured with the main compression actuator 162 with a main compression actuator mounting plate 164. In some embodiments, a roller screw mount 163 is used to secure the main compression actuator 162.

In some embodiments, the main plunger actuator assembly 160 is positioned vertically that a longitudinal axis of the main plunger actuator assembly 160 is substantially perpendicular to the longitudinal axis of the charging actuator assembly 140 (or the charging auger assembly 140*a*). The compression tooling 178 is configured to travel up and down within the compression chamber inner wear sleeve 168 at high rates of speed until a pressure is sensed. When a pressure is sensed, the compression tooling 178 can reconfigure its motion to torque instead of speed until a specified pressure is hit (that which is needed to make an acceptable briquette). Once a briquette is formed, the plunger assembly 160 ejects the briquette through a door actuator 180 before the compression tooling 178 returns to the initial position to begin another briquetting cycle. In some embodiments, a guide sleeve 198 can be provided to facilitate the movement of the compression tooling or plunger 178.

In some embodiments, the main plunger actuator assembly 160 is electrically driven. In some embodiments, the main compression actuator 162 is electrically driven by a servo motor drive or motor 170. In some embodiments, the servo motor drive 170 is a DC motor. Alternatively, the main compression actuator 162 is electrically driven by an electrical stepper motor. In some embodiments, the electrical servo motor 170 is controlled by a controller or processor, for example, the controller or processor depicted in the descriptions in connection with FIG. 7 and FIG. 9. In some embodiments, the compression motor gearbox 172 is controlled by the controller or processor. In some embodiments, the compression motor gearbox 172 is secured by a gearbox mount 173. In some embodiments, the controller or processor is used to control and optimize the speed of the motor 170. The controller or processor can increase or decrease the speed of the main compression actuator 162, for example, by selecting different gear ratios (or frequencies) of the motor 170. In some embodiments, the controller or processor can be further used to control and optimize the force or torque of the motor 170 by increasing or decreasing the torque output of the motor 170.

An electrical driven main plunger actuator assembly 160 offers several advantages over hydraulic or other types of actuators. For example, the electrical driven actuator assembly 160 provides precise and accurate positioning control. The electrical driven main plunger actuator assembly 160 can achieve repeatability within very fine increments, which helps improve product quality and consistency. In addition, the electrical driven main plunger actuator assembly 160 offers versatile control options.

The electrical driven main plunger actuator 160 can be integrated into other components, such as the hopper feeding assembly 120, the charging actuator assembly 140 (or the charging auger assembly 140*a*), and the puck stop actuator 180, etc. In addition, the electrical driven main plunger actuator assembly 160 can be integrated into other programmable logic controllers and computer numerical control (CNC) systems, allowing for precise control over speed, acceleration, and position. This flexibility enables complex motion profiles and synchronized movements in multi-axis systems. Moreover, the electrical driven main plunger actuator assembly 160 can incorporate safety features such as overload protection, position feedback, and emergency stop functions more easily compared to other actuator types.

Moreover, compared to hydraulic actuators or cylinders, the electrical driven main plunger actuator assembly 160 can be more energy-efficient, especially during operation. An electrical driven main plunger actuator assembly 160 consumes power only when actively moving or holding position, unlike hydraulic systems that rely on constant pumping of hydraulic fluid. Furthermore, the electrical driven main plunger actuator assembly 160 operates quietly compared to hydraulic actuators, which can be beneficial in environments where noise reduction is important. Additionally, the electrical driven main plunger actuator assembly 160 generally requires less maintenance compared to hydraulic systems, which need periodic fluid checks. The electrical driven main plunger actuator assembly 160 has fewer moving parts susceptible to wear and typically have longer service intervals, reducing downtime and maintenance costs. Furthermore, the electrical driven main plunger actuator assembly 160 does not require hydraulic fluids, which eliminates the risk of leaks and spills and costly seal replacement. This makes an electric actuator suitable for applications where cleanliness and environmental considerations are critical for operator's safety.

In some embodiments, one or more position sensors, for example, encoders or linear variable differential transformers, can be used to provide real-time feedback on the position of the compression tooling 178. This data can be used by a control system to precisely position the plunger at the desired location. In some embodiments, a closed-loop control system can be used where the actual position of the compression tooling 178 is continuously compared to the desired position. The control system can make adjustments to the input of the electrical servo motor 170 to correct any discrepancies, ensuring accurate positioning.

In some embodiments, one or more speed sensors can be used to measure the rate at which the compression tooling 178 moves. This data is essential for adjusting the speed of the electrical servo motor 170 to achieve the desired plunger movement rate. In some embodiments, the electrical servo motor 170 is controlled by a variable frequency drive or digital drive system, which adjusts the motor's speed based on the control signals. This allows the plunger to move at high speeds when needed.

In some embodiments, one or more torque sensors or load cells are equipped to measure the force exerted by the compression tooling 178. This information helps ensure that the compression tooling 178 applies the correct amount of pressure to form the briquette. In some embodiments, a control system can regulate current and voltage of the electrical servo motor 170 to manage the torque output. By adjusting these parameters, the system 100, 100*a* ensures that the compression tooling 178 generates the necessary pressure for different metal alloy's without exceeding its limits.

Thus, the electrical driven main plunger actuator assembly 160 positions and drives the compression tooling 178 with speed and torque to achieve not only the pressure needed to make a briquette but also a high speed, for example, several cycles per minute. Consequently, the electrical driven main actuator assembly 160 is configured to achieve precision and accuracy, flexible control options, energy efficiency, quiet operation, low maintenance, clean operation, safety features, and integration capabilities with automation systems. In addition, the electrical driven main plunger actuator assembly 160 can communicate data such as position, speed, and torque to higher-level control systems for real-time monitoring, diagnostics, and predictive maintenance, enabling more efficient production processes. Moreover, the electrical driven main plunger actuator assembly 160 is configured to ensure efficient production of briquettes with minimal material waste and consistent quality.

In some embodiments, a roller screw actuator is used in the electrical driven main plunger actuator operation. A roller screw actuator is capable of handling significantly higher loads compared to a ball screw actuator. This is because a roller screw use cylindrical rollers (instead of balls) that have a larger contact area with the screw threads. As a result, roller screws can support higher axial loads and are less susceptible to deformation under heavy loads. Furthermore, a roller screw provides higher rigidity and stiffness compared to a ball screw. The cylindrical rollers distribute the load more evenly along the screw threads, resulting in less deflection and better resistance to bending. This characteristic is beneficial in applications where precise positioning and stability are crucial, such as in machining centers and heavy-duty industrial machinery. Moreover, a roller screw maintains high efficiency even at high loads and speeds. The contact between the rollers and the screw threads reduces frictional losses, allowing the roller screw actuator to operate efficiently and reliably under demanding conditions. This efficiency contributes to energy savings and reduces heat generation during operation.

The door actuator or puck stop actuator assembly 180 is configured to control the movement and positioning of metal briquettes during the briquetting process. The puck stop actuator assembly 180 is primarily responsible for controlling the position of the briquette (or "puck") within the briquetting press. It ensures that each puck is correctly aligned and held in place during the compression cycle. In some embodiments, a puck stop or puck stop guide 182 is provided against which the briquette is formed. The puck stop guide 182 can interact with the briquette to hold it in place. In come embodiments, the puck stop guide 182 is a mechanical block.

In some embodiments, a puck stop actuator 184 is provided to control the puck discharging door 188 allowing the briquette to be ejected.

In some embodiments, the ejection of briquette is performed by a slide motion allowing the puck discharging door 188 to be opened and closed as needed. In some embodiments, the puck discharging door 188 is powered by an electric motor 190, gearbox 192 and puck stop actuator 184 and slides in and out to open and close the puck discharging door 188. In the closed position, the main tooling extends and presses material into the puck discharging door 188 that has closed in the main chamber. Once the puck is made the puck discharging door 188 opens and the main tooling extends to eject the puck. The puck discharging door 188 once again closes and is ready for the next cycle. In some embodiments, the puck is ejected out the bottom opening of the compression chamber inner wear sleeve 168. When the puck discharging door 188 opens, the puck is ejected by the puck stop tooling 186 and once the puck clears the chamber walls, it falls into a container or conveyor, whichever is selected by the operator (not shown).

In some embodiments, the puck stop actuator 184 is electrically driven. In some embodiments, the puck stop actuator 184 is electrically driven by an electrical puck stop servo motor 190. In some embodiments, the puck stop servo motor 190 is a DC motor. In some embodiments, the puck stop servo motor 190 is controlled by a controller or processor, for example, the controller or processor depicted in the descriptions in connection with FIG. 7 and FIG. 9. In some embodiments, the puck stop gearbox 192 is controlled by the controller or processor. In some embodiments, the controller or processor is used to control and optimize the speed of the motor 190. The controller or processor can increase or decrease the speed of slide motion by selecting different gear ratios (or frequencies) of the motor 190. In some embodiments, the controller or processor can be further used to control and optimize the force or torque of the motor 190 by increasing or decreasing the torque output of the motor 190.

In some embodiments, a ball screw actuator is used in the door operation. Advantages of using a ball screw actuator has been described in connection with the charging actuator assembly 140 (or the charging auger assembly 140*a*) and would not be discussed in detail here.

Although the drawings and descriptions above show that one motor 130, 150, 170, 190 is used for driving the operations of each of the assemblies 120, 140, 140*a*, 160, 180, respectively, however, in other embodiments, one or more of the motors 130, 150, 170, 190 can comprise separate motors. In some embodiments, one or more of the motors 130, 150, 170, 190 can comprise at least one motor performing the driving operations of the motors 130, 150, 170, 190.

In some embodiments, as shown in the figures, the metal briquetting system 100 includes a foundation frame or anchor frame 110 which is configured to secure or fix the metal briquetting system 100 to a platform, for example, floor or ground. Each of the hopper feeding assembly 120, charging actuator assembly 140 (or the charging auger assembly 140*a*), main actuator assembly 160, door actuator assembly 180 can be mounted or attached to the anchor frame 110 directly or indirectly.

In some embodiments, the anchor frame 110 can have one or two separated structure uprights or legs 112 that each of the legs has a stability arm 114 extended from a bottom end of its corresponding leg that a longitudinal direction of each of the toes is perpendicular to a longitudinal direction of its corresponding leg. In some embodiments, one or both of the legs can have a stability side arm 116 that a longitudinal direction of the stability side arm 116 is perpendicular to the longitudinal direction of the stability arm 114. In addition, the longitudinal direction of the side toe is perpendicular to the longitudinal direction of its corresponding leg.

In some embodiments, both of the stability arms 114 can be mounted to or forming with a single mounting plate for securing the metal briquetting system 100 to the platform. The stability side arm 116 can be separately mounted to the platform.

In some embodiments, the anchor frame 110 is provided with an anchor mounting plate 118 configured to secure the compression chamber block 166 therewith. In some embodiments, the anchor mounting plate 118 is positioned on top of the structure upright 112.

The anchor frame 110 can be made of rigid materials, for example, mild steel, carbon steel, stainless steel, galvanized steel, cast iron, and composite materials.

In traditional hydraulic systems, the heated oil acts as a thermal conduit, transferring heat to all metal components it comes into contact with. This continuous thermal exchange, combined with the heat generated during the extrusion process, can significantly shorten the lifespan of the coolant used in the system. In contrast, the system 100, 100*a* described here operates without relying on hydraulic oil for power transmission or heat generation. As a result, the system maintains a considerably cooler operating temperature, particularly in the puck, which plays a key role in preserving the integrity and longevity of the coolant throughout the recycling process. Pucks produced by system 100, 100*a* therefore retain substantially less residual heat than those formed using traditional hydraulic systems.

However, some heat may still be introduced through mechanical operations such as extrusion and plunging. While this can leave briquettes warm immediately after formation, they can be cooled to ambient temperature to stabilize their structure and minimize the risk of deformation or damage during subsequent handling and storage. Additionally, during CNC machining, heat can be generated at the interface between the tooling and raw material. In some embodiments, coolant is used specifically to manage this heat, ensuring that both the tool and the workpiece remain within safe and efficient operating temperature ranges.

In some embodiments, the tooling of the CNC machine 200 can be showered in, or mixed with, coolant during the cutting process and this coolant can be drained to an exit reservoir along with the raw material chips cut away by the tooling. As the exit conveyor 202 removes the chips, coolant is carried up and out along with the chips. In other words, coolant is attached to the raw materials or chips being fed into the metal briquetting system 100 from an exit conveyor 202 of the pre-processor or CNC Machine 200.

In some embodiments, a coolant reservoir 204 is employed to efficiently return coolant back to the CNC systems from which it originated. During the compression portion of each cycle, the coolant can be extracted from the material and allowed to flow down into the coolant reservoir 204. In some embodiments, the coolant reservoir 204 is installed at a location under the metal briquetting system 100. In other embodiments, any suitable locations can be used to install the coolant reservoir 204. A pump can be placed with or within the coolant reservoir 204, or other suitable locations, to pump the collected coolant from the coolant reservoir 204 back to the CNC machine 200 through fluid flow paths 210, 212. The fluid flow paths 210, 212 can be constructed by suitable piping or tubing materials.

A bag filter 206, or other suitable components, can be provided in fluid flow paths 210, 212 to capture and/or remove solid particles, debris, and/or other contaminants that could be presented with the coolant. In some embodiments, a bag filter is not used so that the collected coolant can be pumped directly from the coolant reservoir 204 back to the CNC machine 200. Thus, in the present disclosure, the briquetting coolant is extracted from the chips leaving a finished puck that contains around only 3% of moisture.

The compact size of the metal briquetting system 100 enables it to be positioned adjacent to the chip exit conveyor 202 of the CNC machine 200. This close proximity allows the metal briquetting system 100 to promptly return coolant directly to the CNC machine 200, which has its own dedicated coolant filtration systems. This direct return ensures that coolant is returned immediately without mixing with contaminants from other machines. This setup prevents the common issue of mixing contaminants or oils that can occur in traditional briquetting systems.

The metal briquetting system 100 can have a controller or processor which can include programmable drive or custom program configured to achieve the volumes and pressures needed to process material according to industry standards. The controller or processor can create works with the electrical driven actuators to provide speed and torque as well as self-adjusting measures. The controller or processor also assures tooling cannot collide or damage components that might be out of position.

Figure 7:
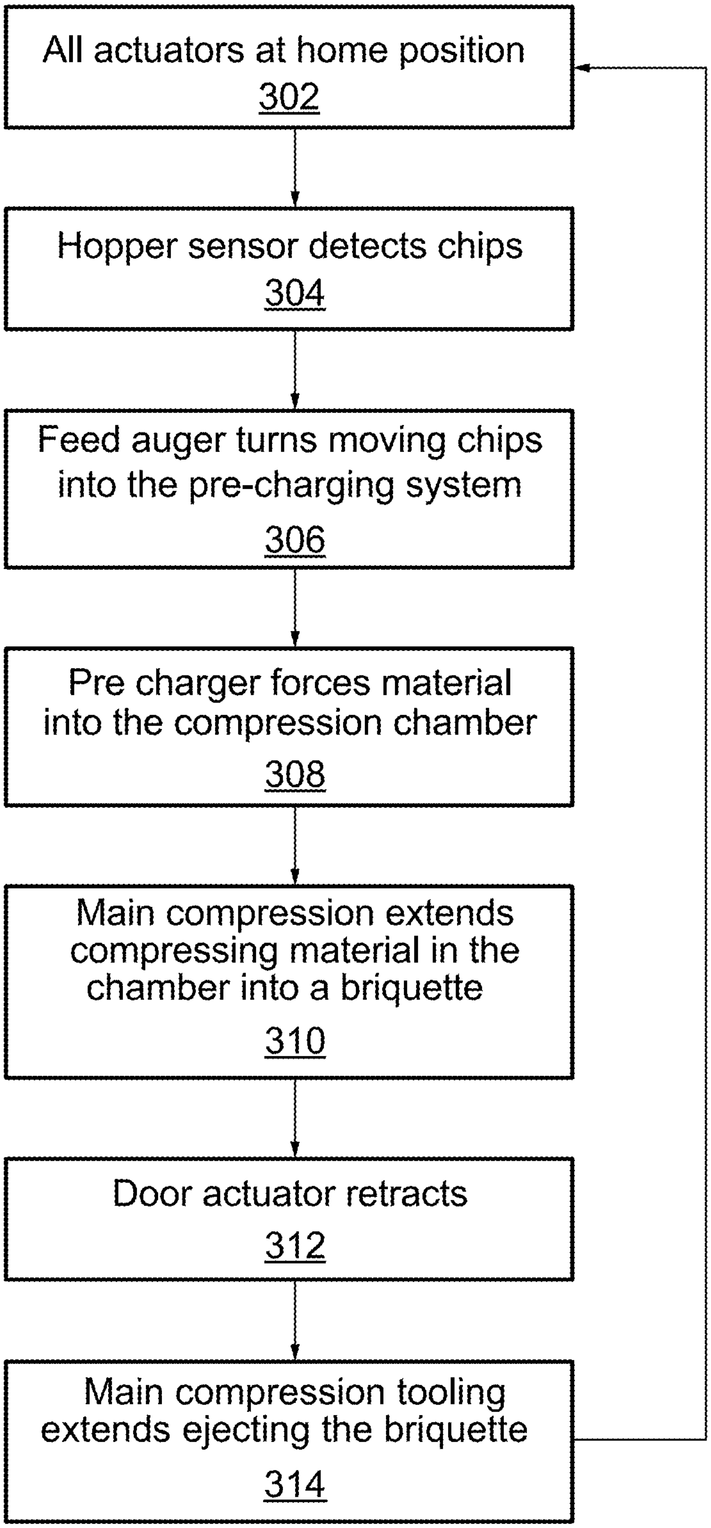
FIG. 7 illustrates an exemplary operation flow of the metal briquetting system of FIG. 1.
Figure 9:
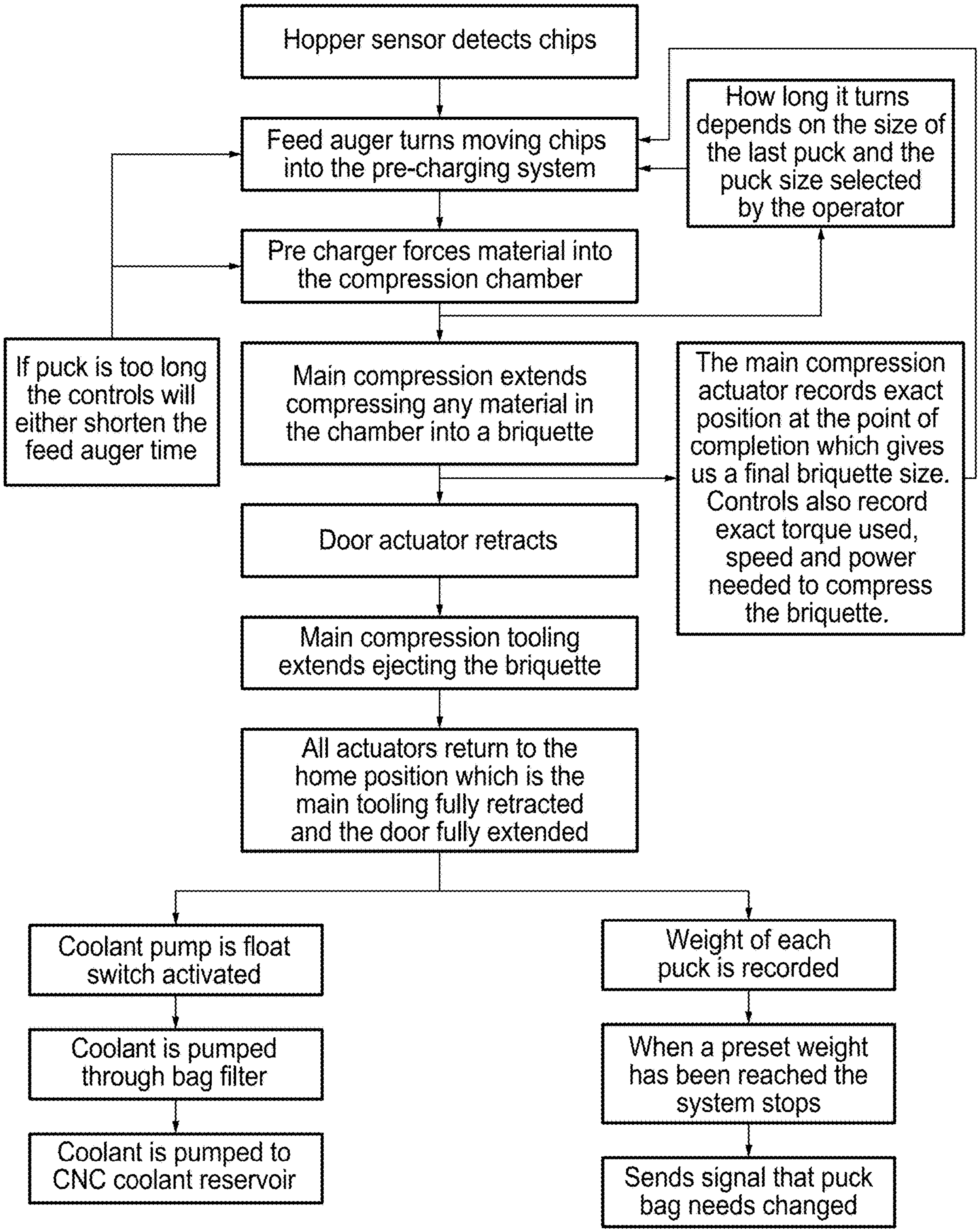
FIG. 9 illustrates another exemplary operation flow of the metal briquetting system of FIG. 1.

Referring also to FIG. 7, which illustrates an exemplary operation flow of the metal briquetting system 100, 100*a*. Referring also to FIG. 9, which illustrates another exemplary operation flow of the metal briquetting system 100, 100*a*. When the system is at starting phase 302, for example, when a briquetting cycle is completed, all actuators return to their respective home or specified positions. Specifically, the main tooling actuator 162 is fully retracted or moved to its specified position, and the door actuator 184 is fully extended.

When chips are detected in the feed hopper 122, for example, by a hopper sensor, the system can be activated to initiate a new briquetting cycle, as depicted in block 304. The feed auger 124 begins to rotate, moving chips into the charging assembly 140, as shown in block 306. The charging actuator 146*a* (or charging auger 146*b*) extends to push the material or chips into the compression chamber 166, as shown in block 308. In block 310, the main compression actuator 162 extends to compress the material or chips into a briquette or puck within the chamber. Following this, the door actuator 184 retracts in block 312. At block 314, the main compression tooling 162 extends to eject the briquette.

In some embodiments, if the charging actuator 146*a* is fully extended or retracted and can accommodate the maximum number of chips allowed, the feed auger 124 will run for a longer period in the next cycle to transfer more chips into the charging assembly 140. Conversely, if the charging actuator 146 is not fully extended, retracted, or does not reach the required length, the feed auger 124 will run for a shorter period in the next cycle, moving fewer chips into the charging assembly 140.

In some embodiments, if the charging auger 146*a* has ceased to run due to too reaching the maximum number of chips allowed, the feed auger 124 can run for a shorter period in the next cycle to transfer less chips into the charging assembly 140*a*. Conversely, if the charging auger 146*a* runs for allotted amount of time without reaching a specified torque, the feed auger 124 can run for a longer period in the next cycle, moving more chips into the charging assembly 140*a*.

Additionally, the duration for which the feed auger 124 operates may vary based on the size of the last puck produced and the puck size set by the controller or processor.

In some embodiments, the controller or processor records the position of the main compression actuator 162 at the end of each compression cycle. This positional information can be used to estimate the approximate size of the final briquettes. For instance, if the main compression actuator 162 is at a position significantly different from its initial location at the end of a cycle, the finished puck may be relatively short. Conversely, if the actuator's position is closer to its initial location, the resulting puck is likely to be relatively long.

The data recorded by the controller or processor can be used to adjust the duration for which the feed auger 124 operates. For instance, if the finished puck is relatively long, the controller or processor may reduce the feed auger runtime in the hopper feeding assembly 120, thereby sending fewer chips to the charging assembly 140 (or the charging auger assembly 140*a*) and subsequently to the main actuator assembly 160. Alternatively, the controller or processor might set a shorter retraction position for the charging actuator 146 (or charging auger 146*a*). By managing either the feed auger operation time, the charging actuator retraction position, or the auger recorded torque spec, the system can maintain consistent briquette sizes.

The controller or processor can also log the precise torque applied, as well as the speed and/or power required to compress the briquette.

The controller or processor can also track the weight of each puck or measure the total weight of the finished pucks in a container. When a preset weight is reached or other predetermined conditions are met, the controller or processor can pause or stop the system. Additionally, the controller or processor can notify an operator when a puck bag needs to be changed.

The controller or processor can also manage the coolant flow, as illustrated in FIG. 6. This includes scenarios such as when the coolant pump is activated by a float switch, when coolant is pumped through the bag filter 206, or when coolant is directed to a CNC coolant reservoir.

The electrical driven metal briquetting system 100, 100*a* provides several advantages over existing hydraulic system. Beyond the described operation components 120, 140, 140*a*, 160, 180, there are additional unique configurations that allow the metal briquetting system 100, 100*a* to operate competitively as described below.

The electrical driven metal briquetting system 100, 100*a* is configured to be a single block frame system and the vertical use of the main actuator allows the metal briquetting system 100, 100*a* to have the smallest footprint on the market for like volume briquette systems. The term "footprint" referred here is the physical space that the entire briquetting system 100, 100*a* occupies within a facility. It includes the total area required to house all its components and operations, ensuring efficient workflow, safety, and maintenance access within the facility.

In addition, the single block frame system is the easiest and fastest "change out" of a damaged unit on the market utilizing a hook frame which allows maintenance to remove fastening bolts without worry of system falling. They can then lift the system on and off the specialized hook to make removal and exchange quick and safe.

Debris build up can cause performance issues and costly damage. The electrical driven metal briquetting system 100, 100*a* is configured to have a coolant and debris cleanout which allows operators to easily clean out fines left from briquette processing, for example, through a compression chamber fines clean out door 194, which can be covered by a compression chamber fines clean out cover 196 when not in use.

Ultimately, what sets the metal briquetting system 100, 100*a* apart is its innovative arrangement of components, enabling advanced programming and controls to support a fully electric system. These configurations ensure durability even under continuous use.

In summary, disclosed herein is an electrical driven metal briquetting system 100, 100*a* that surpasses production expectations, with a smaller footprint, quieter operation, and significantly reduced power consumption. In addition, the electrical driven metal briquetting system 100, 100*a* creates a much safer environment because it reduces forklift travel by close to 80% and avoids potential coolant leaks that can cause slippery floors, and it eliminates potentially fatal hydraulic injuries. Without a doubt, the metal briquetting system 100, 100*a* stands out as unique in the field of briquetting technology.

Figure 8:
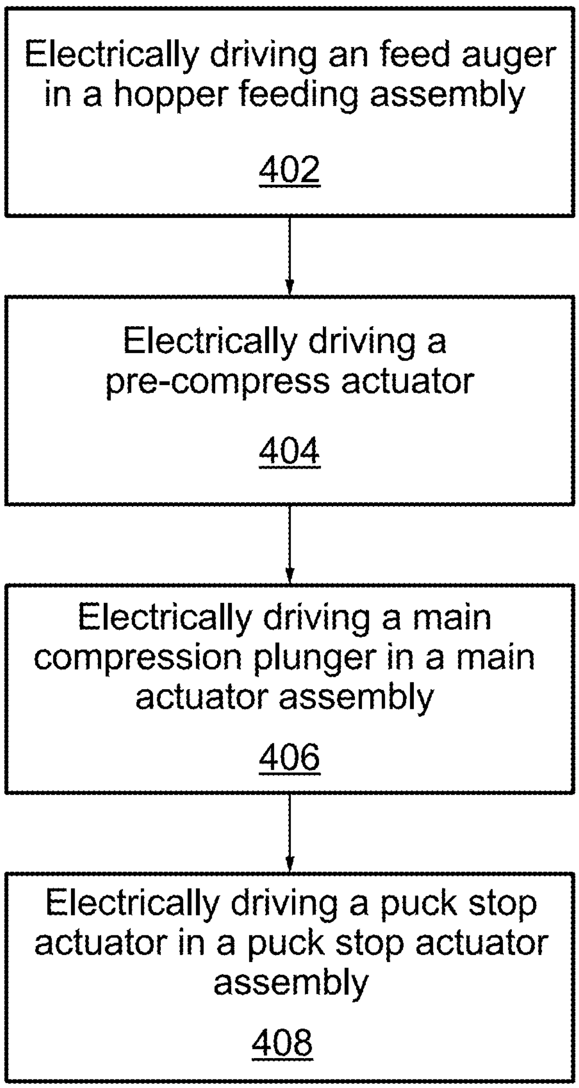
FIG. 8 illustrates another exemplary operation flow of the metal briquetting system of FIG. 1.

Referring also to FIG. 8, in operation, a briquetting process performed by the metal briquetting system 100 can be categorized into several phases: loading phase 402, charging phase 404, extrusion phase 406, 408 and return phase. More or less phases can be adapted to perform the briquetting process. It is understandable to a person skilled in the art that the briquetting process can be performed by combining two or more of the phases and performing them in parallel or pipelined process.

In the loading phase 402, metal powder or chips are fed into the hopper feeding assembly 120. The feed auger 122 is electrically driven by a feed auger by the auger motor 130 to push the metal powder or chips to the charging actuator assembly 140 (or the charging auger assembly 140*a*).

In the charging phase 404, the charging actuator assembly 140 (or the charging auger assembly 140*a*) compresses the metal material in the charging housing frame 142. The charging actuator 146 (or charging auger 146*a*) is driven by the charging motor drive 150. The pressure applied by the charging actuator 146 (or the charging auger 146*a*) compacts the metal particles, expelling excess air and reducing voids in the briquette.

In the extrusion phase 406, 408, as the compression tooling 178 continues to move downward, it begins to compress the chips into a briquette (puck) removing coolant and forming a dense solid briquette. The main compression actuator 162 is driven by compression actuator DC servo motor drive 170. The puck stop actuator 184 is driven by the puck stop DC servo motor drive 190. The compression tooling 178 pushes the compacted metal through and a briquette or die is extruded at the bottom of the main actuator assembly 160. A container or conveyor (not shown) can be provided to receive the ejected briquette. The briquette or die can have a specific shape and size to produce briquettes of desired dimensions. In some embodiments, die can even carry the customer logo causing each puck to have the logo stamped on one side deterring theft of briquettes.

In the return phase, the plunger returns to its initial position (retracted) at the top of the cylinder.

In some embodiments, the briquetting phases can be performed in a pipeline manner. For example, at time Tn, the metal powder or chips are fed into the hopper feeding assembly 120 in the loading phase while the charging actuator assembly 140 (or the charging auger assembly 140*a*) is performing the pre-compression or charging phase with metal material loaded in at an earlier time Tn−1 and the main actuator assembly 160 is forming briquette in the extrusion phase with metal material prepared by the charging actuator assembly 140 (or the charging auger assembly 140*a*) at an earlier time Tn−2. Thus, with the help of synchronization of electrical motors 130, 150, 170, the pipeline process is designed to efficiently transform raw materials into high-quality briquettes suitable for various applications, including energy generation, heating, and industrial processes, while adhering to environmental and quality standards.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For example, the specific sequence of the above-described process may be altered so that certain processes are conducted in parallel or independent, with other processes, to the extent that the processes are not dependent upon each other. Thus, the specific order of steps described herein are not to be considered implying a specific sequence of steps to perform the above-described process. Other alterations or modifications of the above processes are also contemplated. For example, further insubstantial approximations of the above equations are also considered within the scope of the processes described herein. In addition, the various motors used in the MBS described herein can be distinct motors that operate independently, or one or more motors may perform a plurality of actuation functionality.

This disclosure encompasses all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. An electric metal briquetting system for producing metal briquettes, the system comprising:
- a hopper feeding assembly having a feed auger configured to be electrically driven by a first motor to feed raw metal material;
- a charging assembly configured to be electrically driven by a second motor to charge said raw metal material into a charged material;
- a main actuator assembly having a main compression actuator configured to be electrically driven by a third motor to compressed said charged material into a puck;
- a puck stop actuator assembly having a puck stop actuator configured to be electrically driven by a fourth motor;
- a coolant reservoir configured to collect coolant extracted from said puck; and
- a controller configured to work with the main actuator assembly, wherein the controller records the position information of the main compression actuator at the end of a compression cycle, and wherein the recorded positional information of the main compression actuator is used to estimate an approximate size of produced metal briquettes.

2. The metal briquetting system of claim 1, further comprising a pre-treatment processor configured to separate ferrous metals from other raw materials.

3. The metal briquetting system of claim 1, wherein the first motor is controlled by a first motor gearbox, the second motor is controlled by a second motor gearbox, the third motor is controlled by a third motor gearbox, and the fourth motor is controlled by a fourth motor gearbox.

4. The metal briquetting system of claim 3, wherein at least two of the first motor gearbox, the second motor gearbox, the third motor gearbox, and fourth motor gearbox further communicate with a control system for a synchronization of operation between at least two of the first motor, the second motor, the third motor, and the fourth motor.

5. The metal briquetting system of claim 3, wherein the first motor gearbox, the second motor gearbox, the third motor gearbox, and fourth motor gearbox further communicate with a control system for a synchronization of operation between the first motor, the second motor, the third motor, and the fourth motor.

6. The metal briquetting system of claim 3, wherein the first motor gearbox is configured to increase or decrease the speed of the feed auger by selecting different gear ratios or frequencies.

7. The metal briquetting system of claim 3, wherein the second motor gearbox is configured to increase or decrease the speed of a charging actuator by selecting different gear ratios or frequencies.

8. The metal briquetting system of claim 3, wherein the third motor gearbox is configured to increase or decrease the speed of the main compression actuator by selecting different gear ratios or frequencies.

9. The metal briquetting system of claim 3, wherein the main actuator assembly is configured to have a roller screw actuator to handle heavy loads.

10. The metal briquetting system of claim 1, wherein the main compression actuator of the main actuator assembly has a longitudinal axis that is aligned with a longitudinal axis of a compression chamber block.

11. The metal briquetting system of claim 1, wherein the main compression actuator of the main actuator assembly has a longitudinal axis that is not aligned with a longitudinal axis of a compression chamber block.

12. A method for producing metal briquettes from an electric metal briquetting system, the method comprising:

- electrically driving a feed auger by a first motor in a hopper feeding assembly to feed raw metal material;
- electrically driving a charging actuator or a charging auger by a second motor in a charging assembly to charge said raw metal material into a charged material;
- electrically driving a main compression plunger by a third motor in a main actuator assembly to compressed said charged material into a puck;
- recording, by a controller, position information of the main compression plunger at the end of a compression cycle;
- estimating an approximate size of produced metal briquettes based on the recorded positional information of the main compression plunger;
- electrically driving a puck stop actuator by a fourth motor in a puck stop actuator assembly; and
- collecting coolant extracted from said puck by a coolant reservoir.

13. The method of claim 12, wherein the first motor is controlled by a first motor gearbox, the second motor is controlled by a second motor gearbox, the third motor is controlled by a third motor gearbox, and the fourth motor is controlled by a fourth motor gearbox.

14. The method of claim 13, wherein at least two of the first motor gearbox, the second motor gearbox, the third motor gearbox, and the fourth motor gearbox further communicate with a control system for a synchronization of operation between at least two of the first motor, the second motor, the third motor, and the fourth motor.

15. The method of claim 13, wherein the first motor gearbox, the second motor gearbox, the third motor gearbox, and the fourth motor gearbox further communicate with a control system for a synchronization of operation between the first motor, the second motor, the third motor, and the fourth motor.

16. The method of claim 13, wherein the first, second, third and fourth motors comprises separate motors.

17. The method of claim 13, wherein the first, second, third and fourth motors comprises at least one motor performing the driving operations of the first, second, third and fourth motors.

18. A briquetting system for producing briquettes, the system comprising:

- a hopper feeding assembly receiving raw metal material and having a feed auger configured to be electrically driven by a first motor used to feed the raw metal material;
- a charging assembly configured to receive the raw metal material from said hopper feeding assembly and charging said raw metal material into charged material, said charging assembly having a charging actuator or a charging auger configured to be electrically driven by a second motor;
- a main actuator assembly configured to receive said charged material from said charging actuator assembly and further compress said charged material into a puck, said main actuator assembly having a main compression actuator configured to be electrically driven by a third motor;
- a puck stop actuator assembly having a puck stop actuator configured to be electrically driven by a fourth motor, said puck stop actuator assembly controlling a position of the puck generated by said main actuator assembly; and
- a coolant reservoir configured to collect coolant extracted from said puck.

19. The metal briquetting system of claim 18, wherein said collected coolant is pumped back to a pre-processor.

20. The metal briquetting system of claim 19, further comprising a bag filter installed in a fluid flow path from said coolant reservoir to said pre-processor and configured to capture and/or remove at least one of solid particles or debris presented with said collected coolant.

21. A metal briquetting system for producing metal briquettes, the system comprising:

- a hopper feeding assembly receiving raw metal material and having a feed auger and configured to be electrically driven and used to feed the raw metal material;
- a charging assembly configured to receive the raw metal material from said hopper feeding assembly and pre-compress said raw metal material into pre-compressed material, said charging assembly having a charging actuator or a charging auger and configured to be electrically driven;
- a main actuator assembly configured to receive said pre-compressed material from said charging assembly and further compress said pre-compressed material into a puck, said main actuator assembly having a main compression actuator and configured to be electrically driven; and
- a puck stop actuator assembly having a puck stop actuator and configured to be electrically driven, said puck stop actuator assembly controlling a position of the puck generated by said main actuator assembly, wherein a coolant is extracted from said puck, and wherein said extracted coolant is collected by a coolant reservoir.

22. The metal briquetting system of claim 21, wherein said raw metal material is mixed with said coolant by a pre-processor before receiving by said hopper feeding assembly.

23. The metal briquetting system of claim 21, wherein said collected coolant is pumped back to said pre-processor.

24. The metal briquetting system of claim 21, further comprising a controller or processor configured to work with at least one of the charging actuator, the main compression actuator, or the puck stop actuator.

25. The metal briquetting system of claim 24, wherein when the charging actuator is fully retracted the feed auger can run for a first period of time and when the charging actuator is not fully retracted the feed auger can run for a second period of time, and wherein the first period of time is longer than the second period of time.

26. The metal briquetting system of claim 24, wherein a duration for which the feed auger operates is based on one of the size of the last puck produced or the puck size set by the controller or processor.

27. The metal briquetting system of claim 24, wherein the controller or processor records the position of the main compression actuator at the end of each compression cycle.

28. The metal briquetting system of claim 27, wherein the recorded positional information of the main compression actuator is used to estimate an approximate size of the briquettes.

29. The metal briquetting system of claim 1, wherein the metal briquetting system is configured to support a fully electric system.

30. The briquetting system of claim 18, wherein the briquetting system is configured to support a fully electric system.

31. The metal briquetting system of claim 21, wherein the metal briquetting system is configured to support a fully electric system.

32. The method of claim 12, further comprising configuring the electric metal briquetting system to support a fully electric system.

* * * * *